Sept. 4, 1945.  A. G. DEAN  2,383,935
AIRCRAFT OR LIKE HOLLOW BODY WITH EXTERNAL REINFORCEMENT THEREFOR
Filed June 23, 1943  3 Sheets-Sheet 1
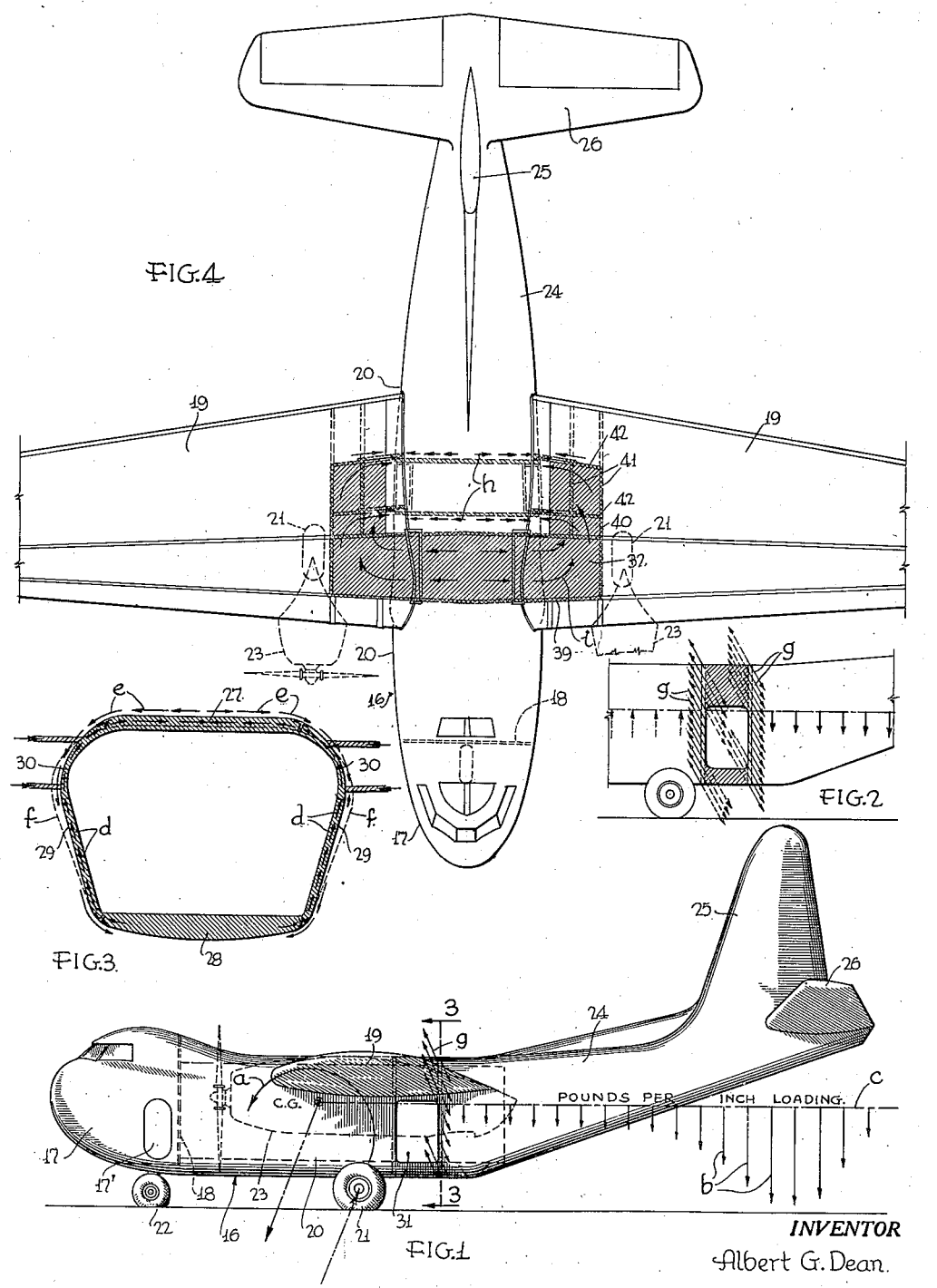
INVENTOR
Albert G. Dean.
BY John P. Bacon
ATTORNEY

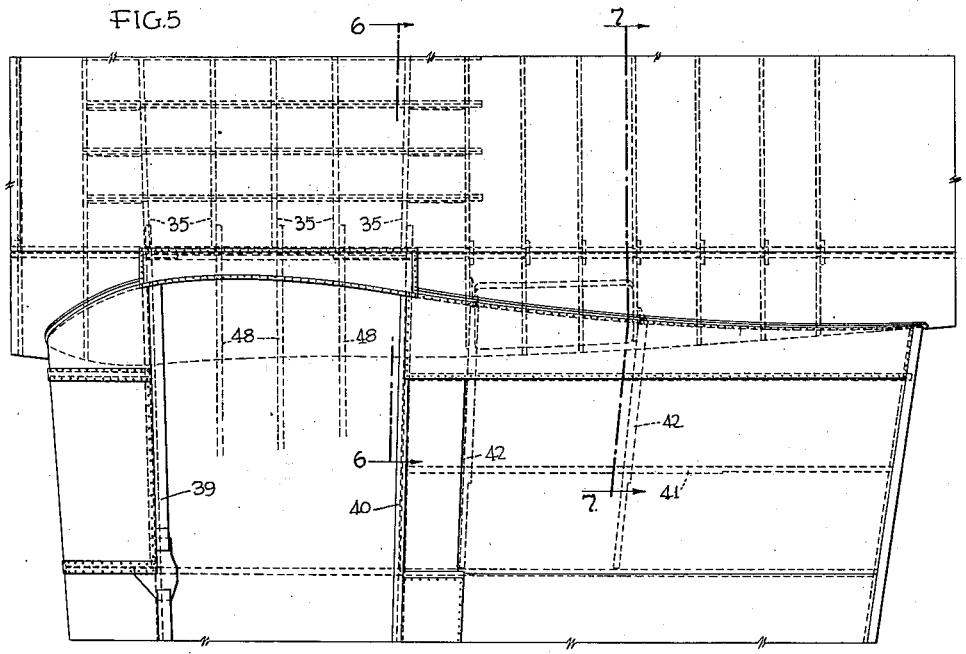
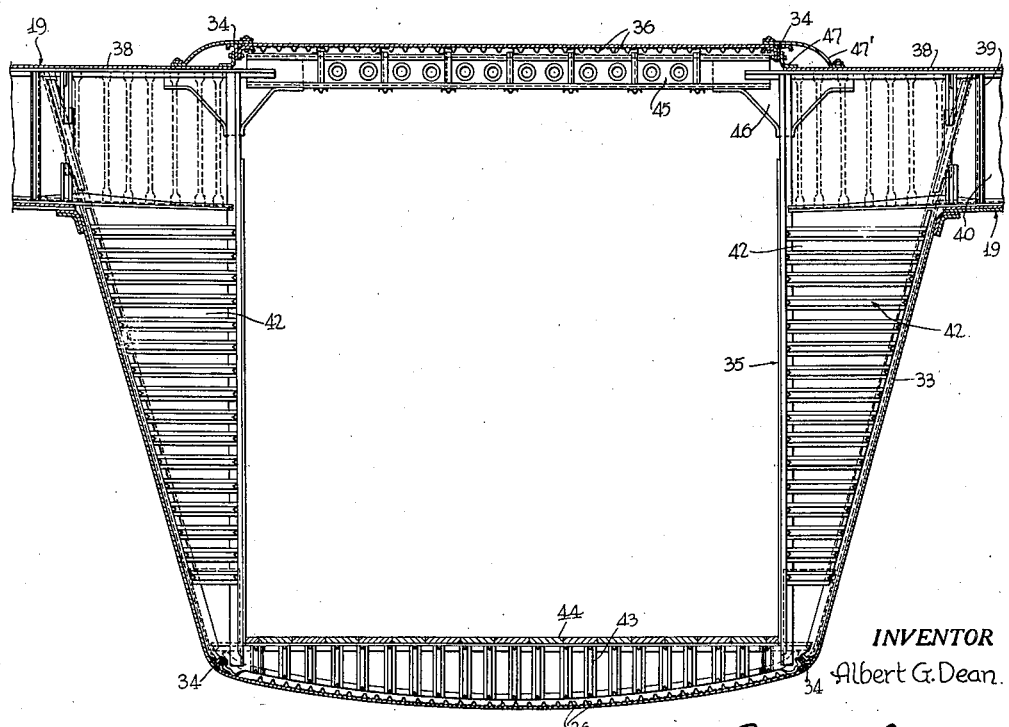

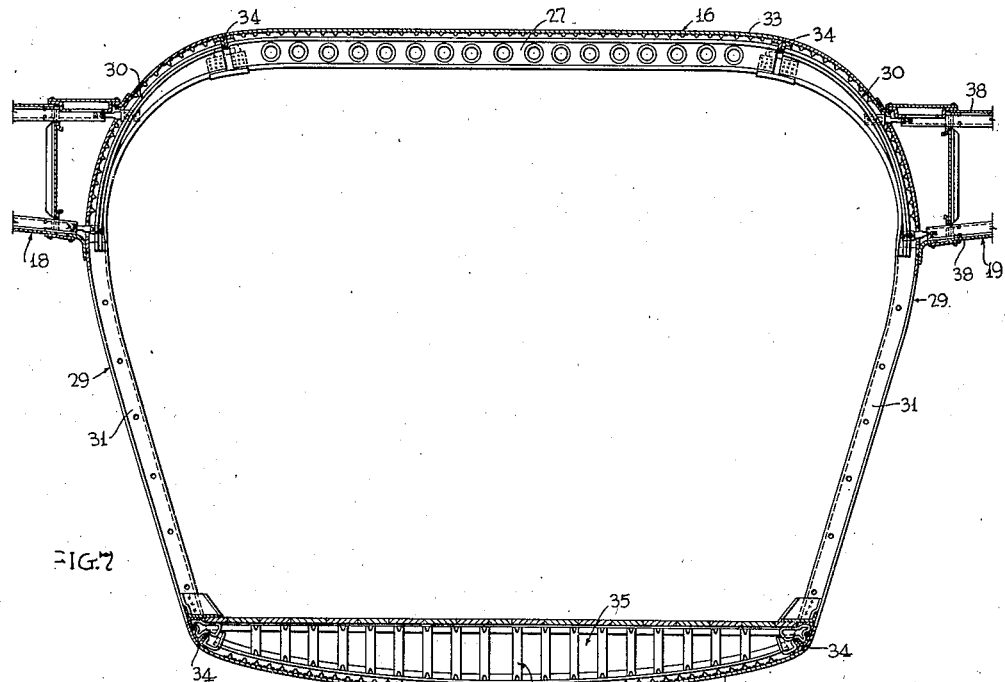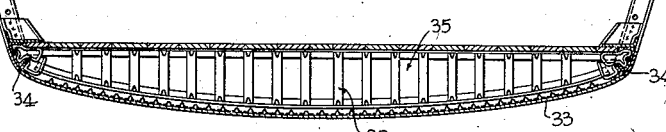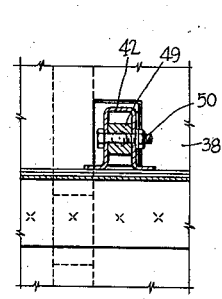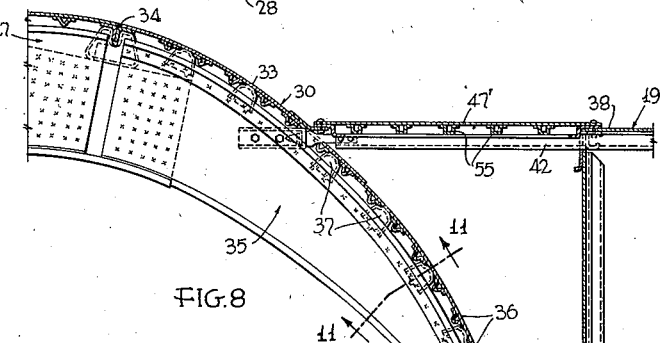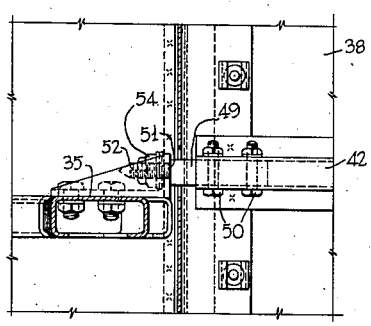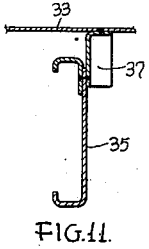

Patented Sept. 4, 1945

2,383,935

UNITED STATES PATENT OFFICE 2,383,935

AIRCRAFT OR LIKE HOLLOW BODY WITH EXTERNAL REINFORCEMENT THEREFOR

Albert G. Dean, Narberth, Pa., assignor to Edward G. Budd Manufacturing Company, Philadelphia, Pa., a corporation of Pennsylvania Application June 23, 1943, Serial No. 491,926

5 Claims. (Cl. 244—117)

The invention relates to aircraft or like hollow bodies and particularly to means for carrying the loading across large doorway or window openings formed in the side walls of such bodies.

The invention is particularly concerned with aircraft or the like having a hollow beam-type such body enclosing a large unobstructed space within its side, top and bottom walls adapted to carry large useful loads. Such bodies are desirably provided with large doorway openings in a side wall or walls which lead to the load-carrying space and facilitate the loading and unloading thereof. Shear loading across such an opening usually results in a transverse bending of the vertical framing members. This bending is normally resisted by reinforcement of the framing members by considerably increasing their depth, or providing internal braces or other internal reinforcing means, but such devices add considerably to the weight of the structure and, additionally, cut down the interior space available for cargo.

It is an object of the invention to strengthen the region spanning such a doorway opening without adding materially to the weight by utilizing for this purpose the attachment of an external structure, such as the wing to the body and the wing structure already present and necessary in any event to carry the weight of the body and cargo. Where the side walls in the body are curved outwardly, as is usual in monocoque or semi-monocoque bodies, the cutting of the doorway opening in such curved-out side walls, brings about a tendency under certain conditions of loading, to bulge out the curved side wall in the doorway region beyond its normal curvature. This tendency may be present in certain highly stressed regions under loading even if no doorway is present. This tendency is due to the manner in which the loads are carried through the walls including the stressed skin of this type of airplane body, which type is best adapted to carry the loads with a minimum of weight. In conditions of landing, the loads to be carried across such opening are particularly high, augmenting the tendency of the side wall in the doorway region to bulge outwardly, and, to counteract this tendency, the wing of the airplane is attached to the side of the body containing the doorway opening in a manner to span said opening and so that its structure and its attachment to the body are utilized to reinforce the body side wall from the outside to resist such outward bulging. In this way, the necessary strength of the body wall across the doorway opening is attained with a minimum of weight, and with a maximum of interior space for the loading of cargo. In other words the structure of the wing and its attachment to the body is utilized to apply an external reaction rather than an internal reinforcement to resist the outward bulging tendency of the side wall of the body in the doorway region, thus utilizing an external structure already present which can be made readily available for this purpose and for materially less weight.

Other and further objects and advantages and the manner in which they are attained will be made clear from the following detailed description when read in connection with the accompanying drawings forming a part of this specification.

In the drawings:

Fig. 1 is a diagrammatic side elevational view of an airplane to which the invention is shown applied, indicating certain of the load and shear forces acting thereon.

Fig. 2 is a diagrammatic side elevational view of the portion of the body in the doorway region showing by means of arrows the direction of certain forces acting thereon.

Fig. 3 is a diagrammatic cross sectional view, on an enlarged scale, taken substantially on the line 3—3 of Fig. 1, this diagram indicating by means of arrows the direction of certain forces tending to cause outward bulge of the curved sides of the body, as indicated by the dotted lines.

Fig. 4 is a plan view of the airplane showing diagrammatically the manner in which the outwardly bulging tendency in the doorway region is resisted by the wing structure and its attachment to the body.

Fig. 5 is a fragmentary plan view on an enlarged scale, of a portion of the body and a portion of a wing, showing details of the wing attachment extending across the side doorway opening in the body.

Fig. 6 is an enlarged detail cross sectional view, of the body and the root portions of the wings, the view being taken substantially on the line 6—6 of Fig. 5, and showing the primary attachment of the wing to the body.

Fig. 7 is an enlarged detail cross sectional view through the body at the doorway openings and showing a portion of the wings attached thereto, the section being taken on the line 7—7 of Fig. 5, the doorway framing being omitted.

Fig. 8 is an enlarged fragmentary sectional view similar to Fig. 7, showing in greater detail the wing attachment to the body.

Figs. 9, 10 and 11 are fragmentary sectional detail views taken respectively, on the lines 9—9, 10—10 and 11—11 of Fig. 8.

The problem with which applicant was faced and the manner of its solution is perhaps best illustrated and described in connection with the specific type of airplane shown in the more or less diagrammatic views of Figs. 1 to 4 inclusive, although it will be understood that in its broader aspects it is equally applicable to other types of airplanes.

In these views, an airplane body 16 of the semi-monocoque type is illustrated, this body having a rounded nose portion 17 containing the pilot's cabin, etc., and terminating slightly rearward of the rear edge of a forward door opening, indicated at 17', in a strong transverse bulkhead 18, and having the space rearward of this bulkhead to and beyond the trailing edge of the wings 19 forming an elongated unobstructed space between the side, top and bottom walls of the body for the storage of cargo or other useful load. This portion of the body, designated 20, extends generally horizontally when the plane is resting on the ground and is supported, in this embodiment, by two laterally spaced rear main wheels as 21 and a single front or nose wheel, as 22. The rear or main wheels 21 are located laterally, preferably, under the spaced engine nacelles, indicated at 23, one secured to each wing 19, and longitudinally, slightly aft of the center of gravity of the plane, indicated by C. G. in Fig. 1. Aft of the generally horizontal cargo carrying body portion 20, is extended the tail portion 24 which, in the embodiment, is projected in rearward and upward direction and carries at its rear end the usual vertical and horizontal tail surfaces, diagrammatically indicated at 25 and 26 respectively.

As shown in the diagrammatic showing of Fig. 3 and in the section of Fig. 7, the top and bottom walls 27 and 28 of the body are generally rectilinear and stiff against bending under endwise loading in a transverse plane, and the side walls 29 are outwardly bowed, each having a substantially rectilinear portion inclined outwardly and upwardly for most of its height and merging through upper rounded portions 30 above the doorway openings, as 31 therein into the rectilinear top wall 27.

With such a construction, when the plane is making a landing with the rear wheels 21 striking the ground first, then, by reason of the forward location of the center of gravity, the plane pivots, as indicated by the curved arrow a, Fig. 1, about the ground engaging line of the rear wheels until the front wheel 27 also engages the ground. In such pivotal movement, the tail portion, particularly, if the brakes are applied to the wheels 21 as soon as they engage the ground, is accelerated rapidly upwardly imposing very severe inertia loading upon the portion of the body cut by the door openings 31, in the opposite sides thereof, these openings being located rearwardly of the rear wheels 21 and extending vertically from the floor line of the cargo space to the curved upper portions 30 of the respective side walls, see Fig. 7. In Fig. 1, the length of the arrows b and their direction downwardly from the horizontal dot and dash line c through the center of gravity of the plane give a rough indication of the inertia loading which may result in the tail portion 24 under such landing conditions and at various distances from the center of gravity.

This loading will be carried in large part as shear through the reinforced skin of the side walls 26 as indicated by the arrows d, Fig. 3, these shear forces being reacted by counter forces, as indicated by the arrows e, Fig. 3. These forces in the doorway region have a tendency to bulge out still further the already curved side walls 29, as indicated by the dotted lines f, of Fig. 3.

The reason for this tendency is believed made still clearer by the inclined arrows g, of Figs. 1 and 2 showing by their different length, the relatively greater unit shear loads, which have to be carried by the curved side walls above and below the door openings to balance the shear at opposite sides of the door openings. At the bottom of the door opening this difference is not important, because of the thickness and stiffness of the bottom wall, see Fig. 7, the top of which is substantially in the plane of the bottom of the doorway openings. In Fig. 1, the opposing shear forces are indicated at the rear margin of the door opening only, but obviously similar forces would also act at the forward margin of the door opening, but in reverse manner, as indicated in Fig. 2.

It was to prevent this tendency to outward bulging of the side wall at the doorway openings 31, and to do this without encroaching upon the cargo space and with a structure of minimum weight, that the present invention was devised. This was achieved by attaching the wings 19 to the body 16 so that the wing structure span the doorway opening. The wing structure and the attaching means therefor already present and necessary in any event for carrying the body are, by the invention, utilized to perform the additional function of opposing a reaction to the outward bulging tendency of the side walls in the doorway region. The manner in which the wing structure and its attachment to the body performs this function is diagrammatically shown in Fig. 4. In this figure, the darkened areas indicated by reference numeral 32 indicate the parts of the wing structures and the wing attaching means and body structure which are utilized in the manner of a C-frame to provide external reinforcement and reaction against the opposite sides of the body above the doorway openings to prevent the above-mentioned tendency of the side walls to bulge outwardly, a tendency indicated in this figure by the outwardly pointing arrows h, the arrows i indicating the manner in which the C-frame-shaped shaded area of the structure opposes the bulging tendency indicated by arrows h.

The plane structure embodying the invention is shown as fabricated of high strength material, such as high-tensile stainless steel, the parts being adapted to be joined substantially throughout by spot-welding so as to preserve substantially the full strength of the material.

The body, particularly through the cargo-carrying central portion 20 thereof opposite which the wings 19 are attached, is covered by an outer smooth metal skin sheet 33 reinforced on the inside by spaced longerons, generally indicated at 34 and transversely extending frames or bulkheads, designated generally by 35, these frames being in effect continuous around the body, but being of different weight and construction in the side, top and bottom walls as clearly shown in Figs. 6 and 7. The skin sheet is rigidly secured throughout to the longerons 34 and the frames 35 either directly, or through the interconnection of longitudinally extending stiffening stringers 36, which are secured to the skin sheet and to the frames, to the latter preferably by suitable clips as 37, shown only in the enlarged views of Figs. 8 and 11. Such clips are employed wherever the skin sheet 33 is spaced from the frames or bulkheads 35 by longitudinal stringers 36.

The wings 19, particularly at their inner ends, where they join the body, are made relatively thick and taper from their inner ends both in thickness and in chord in a usual manner. They are likewise covered in this region by a stressed sheet metal skin sheet 38 which conforms in fore and aft section to an appropriate airfoil section and their internal reinforcement may comprise a pair of spars 39 and 40 secured to the skin sheet and transverse ribs 41 secured to the spars and to the wing skin sheet 38 forming the usual main box section load carrying portion of the wing. The spars and the means by which they and the reinforced skin sheets are attached to the body form what may be termed a primary attaching means for the wings. The trailing portions of the wings aft of the spars 40 extend cantilever-fashion from the main box section load carrying portion and span the respective doorway openings 31 and their top and bottom skin sheets 38 in this doorway region are reinforced by longitudinal stringers 42 extending some distance into the adjacent wing across several transverse wing ribs 41. These stringers are strongly secured to the wing skin sheets 38 and to the ribs 41 which they cross and form what may be termed a secondary attachment of the wing to the body on the opposite sides of a doorway opening.

In the region of the primary wing securement, the body is reinforced by a number of closely spaced bulkheads 35 surrounding the cargo space, Fig. 6 showing a typical such bulkhead and the manner in which a wing spar 40 is secured thereto. The sides 42 of these bulkheads are of generally triangular shape, the wide upper ends of which overlap the adjacent wing spar and are strongly secured thereto. The bottom frame member 43 is of substantial depth, but less than the main portions of the sides 42, and serves to support the flooring as 44 and the loads carried thereby in the cargo space.

At its ends the bottom member 43 is strongly secured to the sides 42. At the top, the sides 42 are connected by a lighter top member 45 as by gussets 46 or otherwise. In this region and throughout its width the wing skin sheet is connected to the sheathing of the body by angle strips 47 a closing strip 47' fairing the wing into the body. Other longitudinally extending wing reinforcements, as 48 arranged between the spars 39, 40, see Fig. 5 are secured to the bulkheads intermediate the two end bulkheads to which the spars 39 and 40 are attached. The further detail of this primary attachment is fully described and claimed in a copending application Serial No. 492,494 for "Aircraft construction," filed June 28, 1943, and further description thereof herein is believed unnecessary.

The secondary attachment of the wing to the body is made, in the front and rear margins of the doorway opening, as shown in detail in Figs. 7 to 11 inclusive. Only the attachment to the rear margin is shown and described, it being understood that the attachment at the front margin is similar. It will be seen, Fig. 7 that the transverse body frames 35 in this region, particularly in the side wall portion thereof, are very much lighter than the bulkhead frames 35 to which the primary wing securement is made.

Since the connections of the longitudinal wing stringers 42 to the transverse body frames 35 at the opposite sides of the door and at the top and bottom of the wing are the same, only the connections shown in detail in Figs. 8, 9 and 10 need be described. It will be seen that each stringer 42 comprises a flanged channel welded to the skin sheet 38 through its flanges and between the side walls of which is telescoped an attachment fitting as 49, secured thereto by bolts 50. The attachment fitting is provided with a shoulder 51 beyond which is projected a screw-threaded portion 52. This portion 52 is received within a hole in a bracket 53 bolted to the adjacent frame 35. The bracket 53 is drawn up and clamped against the shoulder 51 by a nut 54 screwed onto the screw-threaded portion 52 of attachment fitting 49, and locked in place by suitable lock nut. After all the stringers 42 have been so secured, the top and bottom filler skin sections 47' in this region are secured in place securing the wing skin 38 to the body skin 33 and fairing the two outer surfaces into each other. If desired, the upper filler section 47 because of its width may be stiffened by channel stiffeners 55 as shown in Fig. 8.

From the showing in Figs. 7 and 8, it will be evident that the top stringers 42 are secured to the body frames 35 near the merger of the curved side wall portions 30 with the substantially rectilinear top wall 27 of the body and the bottom stringers 42 are secured at the beginning of the curved portion 30 just above the adjacent doorway opening 31, so that these members form reaction points to resist the bending induced in the frames 35 which act as stiffeners for the curved shear resisting side walls in this region. With this arrangement, it becomes desirable to lighten the frame members 35 in this region between the top and bottom connections of the stringers 42 as shown in Fig. 7, since by making the frame members 35 flexible in bending near the bottom stringers 42 the secondary bending is still further reduced and the transverse loads which would normally act in this region to produce bending are by-passed through the stringers 42 into the wing structure and through the wing structure to the primary connections of the wing to the body in the manner indicated in Fig. 4. On the other hand, to take the heavy compression loads in this region, the top portions of the frame members 35 in the margins of the door openings may be made somewhat heavier than the side portions thereof, as shown most clearly in Figs. 7 and 8.

In one aspect of the invention, the construction so provided may be considered a box cantilever beam formed by the wing ribs 41 near the body, and the top and bottom wing skin sheets 38, which beam projects aft of the box section main wing beam portion comprised by spars 39, 40 and the ribs and sheathing interconnecting them and bears, through stringers 42, against the adjacent curved body side wall at four points to resist the tendency of this curved side wall to bend outwardly. It forms an external reinforcement which is an integral part of the wing structure and wing attachment to the body and thus adds little if any weight to the overall structure and leaves the inside space the largest possible unobstructed space for the loading of cargo.

While the invention has been described herein as applied to a specific construction of airplane body, and, specifically, to reinforce an opening, such as a door opening therein, this same principle could be used to lighten standard frames under extreme load concentration or even normal conditions without an opening, and it will be understood that it is equally applicable to bodies of other constructions and under such other conditions, and in the appended claims it is desired to cover such other constructions as clearly fall within the spirit and scope of the invention.

What is claimed is:

1. An airplane comprising, in combination, a tubular body the side walls of which are subjected to shear loads, an area of shear-taking deficiency in a side wall of the body imposing concentrated shear loads in an adjacent shear zone, which concentrated shear loads tend to produce lateral distortion in said shear zone, the side wall including heavy structural elements providing a heavily reinforced region longitudinally to one side of said area and light structural elements in said shear zone which are designedly made of sufficiently less strength than said heavy elements to make the side wall alone, at the shear zone, relatively free to distort laterally, and a wing structure comprising a main load-carrying portion directly secured to the structural elements of the body side wall in said heavily reinforced region and a portion extending, cantilever-like, longitudinally of the airplane from said main load-carrying portion, spanning said shear zone and connected to the light structural elements of the body in said zone and having spanwise strength to resist the lateral distortion of said side wall in said zone.

2. An airplane comprising, in combination, a hollow tubular body having a doorway opening in a side wall thereof, a relatively heavy main bulkhead structure reinforcing said body side wall and removed some distance longitudinally of the body from said opening and a relatively light bulkhead structure reinforcing said body side wall at opposite sides of said doorway opening constituting the body side wall in the doorway region of insufficient strength to take the concentrated shear loads in said region without lateral bending of the said wall, and a wing structure comprising a main load-carrying beam portion directly secured to said main bulkhead structure of the body and a lighter portion extending, cantilever-fashion, longitudinally of the airplane from said main load-carrying portion and across the said doorway opening, and reinforcing means provided in said lighter wing portion and connected both to said beam portion and to the relatively light body framing on opposite sides of the doorway opening to resist through the wing structure the lateral bending tendency of the body side wall in said region.

3. An airplane comprising, in combination, a tubular body the side walls of which are outwardly bowed for at least a part of the length of the body and subjected to shear loads, a doorway in said bowed part of a side wall constituting an area of shear-taking deficiency in said wall imposing concentrated shear loads in an adjacent shear zone, which concentrated shear loads tend to produce lateral distortion in said shear zone, the side wall including a heavy bulkhead structure on one side of said opening and relatively light bulkhead structure in the region of said doorway opening flexible in bending whereby the wall alone at the shear zone is relatively free to distort laterally, and a wing structure comprising a main load-carrying beam directly secured to said heavy bulkhead structure and a cantilever extension from said beam extending longitudinally of the airplane and spanning the doorway and attached to the relatively light bulkheads in said doorway region to counteract the lateral bending tendency in said region of concentrated shear loads, which extension has spanwise strength to resist the lateral distortion of said side wall in said shear zone.

4. An airplane comprising, in combination, a hollow tubular body having a doorway opening in a side wall thereof, and having an unobstructed cargo space enclosed within its walls and extending above the top of said doorway opening, a relatively heavy wing attaching bulkhead structure longitudinally on one side of said doorway opening and relatively light frames at opposite sides of said doorway opening constituting the body side wall in the doorway region by itself of insufficient strength to take the concentrated shear loads in said region without lateral bending of said side wall, and a wing structure comprising a main load-carrying beam portion directly secured to said heavy bulkheads of the body and having a reinforced cantilever extension from the root portion thereof extending longitudinally of the airplane over said doorway opening and being for the most part disposed below the top of said unobstructed cargo space and attached to said relatively light frames at the opposite sides of the doorway opening to counteract the lateral bending tendency caused by the concentrated shear loads in said doorway region.

5. An airplane comprising, in combination, a hollow tubular body having a doorway opening in a side wall thereof and having an unobstructed cargo space enclosed within its walls and extending some distance above the doorway opening, a relatively heavy wing attaching bulkhead structure bracing said body side wall at some distance longitudinally from said doorway opening and relatively light bulkheads bracing said side wall at opposite sides of said doorway opening and constituting the body side wall in the doorway region by itself of insufficient strength to take the concentrated shear loads in said region without lateral bending of said side wall, and a wing structure comprising a box-sectioned main beam portion, the main beam being directly secured to said heavy bulkhead structure, and a trailing portion the lift load of which is substantially wholly carried to the body of said main beam, said trailing portion extending across the top of said doorway and being for the most part disposed below the top of said unobstructed space, said main beam and trailing portions being tied together by ribs and sheathing, and relatively short spanwise extending stringer elements underlying and connected to the sheathing in the vicinity of the doorway and anchored at their inner ends to said light bulkheads at the opposite sides of the doorway opening to resist through the wing structure the lateral bending tendency of the body side wall in said region of concentrated shear load.

ALBERT G. DEAN.